United States Patent [19]

Lin et al.

[11] Patent Number: 5,205,700
[45] Date of Patent: Apr. 27, 1993

[54] LOAD CARRYING ATTACHMENT FOR MOTOR VEHICLE

[75] Inventors: Jhy-hong Lin, Milwaukee; John J. Daily, Waukesha, both of Wis.

[73] Assignee: Ortho-Kinetics, Inc., Waukesha, Wis.

[21] Appl. No.: 785,554

[22] Filed: Oct. 31, 1991

[51] Int. Cl.$^5$ ............................................. B65G 67/02
[52] U.S. Cl. ............................ 414/540; 224/42.03 R; 224/42.08; 414/550; 414/555; 414/921
[58] Field of Search ............... 414/540, 546, 550, 555, 414/462, 921; 224/42.03 R, 42.05, 42.07, 42.08

[56] References Cited

U.S. PATENT DOCUMENTS

| | | | |
|---|---|---|---|
| 1,572,815 | 2/1926 | Schultz et al. | 224/42.05 |
| 1,585,871 | 5/1926 | Pels | 224/42.05 |
| 3,913,811 | 10/1975 | Spencer | 224/42.08 |
| 4,556,358 | 12/1985 | Harlan | 414/550 |
| 4,705,448 | 11/1987 | Mungons | 414/462 |
| 4,710,090 | 12/1987 | DeLuca et al. | 414/550 |
| 4,746,263 | 5/1988 | Cook | 414/540 X |
| 4,932,703 | 6/1990 | Chamberlin et al. | 224/42.03 R X |
| 4,971,509 | 11/1990 | Sechovec et al. | 414/921 X |
| 5,090,580 | 2/1992 | Nelson | 414/921 X |
| 5,122,024 | 6/1992 | Stokes | 414/462 |

FOREIGN PATENT DOCUMENTS

| | | | |
|---|---|---|---|
| 2516460 | 5/1983 | France | 224/42.05 |
| 1444189 | 12/1988 | U.S.S.R. | 414/540 |

OTHER PUBLICATIONS

"Escort II XL Fully Automatic Fold-Up Scooter Carrier" brochure, 1990. Worldwide Engineering.
"Out-Sider Fully Powered Rear Exterior Scooter Lift" brochure, 1991. Bruno Independent Living Aids, Inc.
"Convenient Electric Transport Systems" brochure, 1990, pp. 1, 13 and 16 Electric Mobility.

*Primary Examiner*—David A. Bucci
*Attorney, Agent, or Firm*—Fuller, Ryan, Hohenfeldt & Kees

[57] ABSTRACT

An attachment for the rear of a motor vehicle for transporting a personal mobility vehicle includes a load carrying frame pivotally attached to a first frame member and is pivotable from a storage position to an extended load carrying position transverse to and extending rearwardly from the first frame member. Such support arms on each side of the attachment are provided to attach the frame members together in the extended position. A load securing cross member is secured at one end to the center of the first frame member and at its opposite end to the center of the rear frame member. A hoist mechanism may be attached to one end of the first frame member rotatable on the support about a vertical axis and pivotable thereon in a vertical plane.

5 Claims, 9 Drawing Sheets

Fig. 11

LOAD CARRYING ATTACHMENT FOR MOTOR VEHICLE

FIELD OF THE INVENTION

This invention relates to load carrying attachments for motor vehicles. More particularly, the invention relates to an expandable, collapsible platform for carrying personal mobility vehicles or other similar load at the rear of a motor vehicle.

Personal mobility vehicles or scooters have seen increased usage with the advent of increased access to public and private places by disabled persons. One challenge has been to provide an economical and effective way to transport such personal mobility vehicles from place to place for use. Various devices designed to fill this need have been heretofore utilized.

For example, ramps have been employed to drive a personal mobility vehicle into a rear of a motor vehicle such as a van. Another device in use has been a mechanized elevator platform attached to the rear of a motor vehicle to raise the platform with the scooter thereon from the ground to an elevated position behind the vehicle. Other devices use hoists that can be extended and pivoted, for example, from inside of the vehicle to lift a scooter into the rear of the vehicle.

All of the solutions heretofore provided have suffered from various deficiencies such as expense or inconvenience. A need has thus continued to exist for an attachment for a motor vehicle that is convenient and economical to use and which overcomes the aforementioned shortcomings of the prior art devices.

It is a principal object of the present invention to fill this need by providing a load carrying platform for a personal mobility vehicle or similar load that is readily attachable to the rear of a motor vehicle, for example, by insertion into a standard trailer hitch receiver fixed thereto.

Another aspect of the invention is to provide such a load carrying attachment which can readily be collapsed into a compact position when not in use and which can be extended easily into a load transporting position.

Another related aspect is to provide such a device which although being collapsible and extendable has the strength required to transport a heavy load such as a personal mobility vehicle.

A still further aspect of the invention relates to providing a load carrying platform in which the platform and transported vehicle together provide a stable, strong attachment of a type usable over public highways. An important further aspect of the invention is to provide a load carrying attachment for a vehicle which is secured in a compact position transverse to the axis of the vehicle in the out-of-use position but which extends rearwardly in a single plane to a transport position located directly behind the rear of the vehicle. This plane may be a horizontal plane extending back from the rear bumper of the vehicle or, preferably, may be a plane which slopes slightly upward from the rear bumper of the vehicle. A still further aspect of the invention is to provide a load carrying platform for a personal mobility vehicle wherein the vehicle itself provides stability to the attachment when extended into the load carrying position and loaded. A still further related aspect of the invention relates to provision of a load hold down bar which may also provide strength and integrity to the attachment.

Briefly summarized, the invention provides an attachment for the rear of a motor vehicle for transporting a load, especially a personal mobility vehicle. The attachment includes a stationary first frame member removably attachable to the rear of a motor vehicle in a horizontal orientation transverse to the longitudinal axis of the vehicle. A load carrying frame is pivotally attached to the first frame member at least one pivot point and is pivotable from a storage position in a horizontal plane parallel and adjacent to the first frame member to an extended, load carrying position transverse to and extending rearwardly from the first frame member. Means are provided to secure the load carrying frame in the storage position.

Means in the form of side support arms on each side of the attachment are also provided to attach the frame members together in the extended position. The opposed side frame members may both be pivotally attached at one end to the first frame member and pivotally attached at the opposite end to the rear load supporting frame member. In one embodiment of the invention each of said side members is formed of two pieces that are joined at a central pivot point, so that the load carrying frame can be extended by pivoting each of the side members into linear alignment.

Alternatively, the frame is foldable from a storage position wherein one of the side members is pivotally attached to the first frame member and to the rear frame member. The opposite side member is folded against said side frame member, and the other side frame member is folded against a rear frame member and is pivotally attached only to one of the transverse members and is detachably pinned to the other.

According to a further aspect of the invention, a load securing cross member is connected at one end to the center of the first frame member and at its opposite end to the center of the rear frame member. In accordance with yet another aspect, a hoist mechanism is attached to one end of said first frame member by means of a support affixed to said frame member, the hoist mechanism being rotatable on the support about a vertical axis and pivotable thereon in a vertical plane. The hoist mechanism, further, is provided with an extendable retractable flexible load lifting line such as a metal cable.

BRIEF DESCRIPTION OF THE DRAWINGS

The invention will be more fully explained by means of the following detailed description and accompanying drawings wherein.

DETAILED DESCRIPTION

Referring particularly to the drawings, numeral 10 illustrates an attachment of this invention which is designed to carry a load such as a personal mobility vehicle 11 on the rear of a motor vehicle 12. In the preferred embodiment, attachment 10 is secured to the rear of motor vehicle 12 by means of a hollow sleeve 14 having a square external cross-section. The sleeve 14 is sized for fitting engagement into a hollow trailer hitch receiver fixed to the rear of the vehicle at a central location.

The attachment of this invention includes a stationary first frame member 16 which is secured to hollow tube 14 at right angles, for example, by means of a yoke 18.

In the preferred embodiment a hoist 20 is attached by means of a bracket 22 to one end of stationary member 16. Bracket 22 provides a vertical axis 24 for rotation of hoist 20. A winch 26 preferably electrically powered is provided for extending and retracting a line 28 which is preferably a steel cable for hoisting of mobility vehicle 11. A horizontal axis 30 is also provided to enable the raising and lowering of hoist 20. A hydraulic cylinder 31 or equivalent device can be provided to enable raising and lowering of hoist 20.

Figures 7, 8:
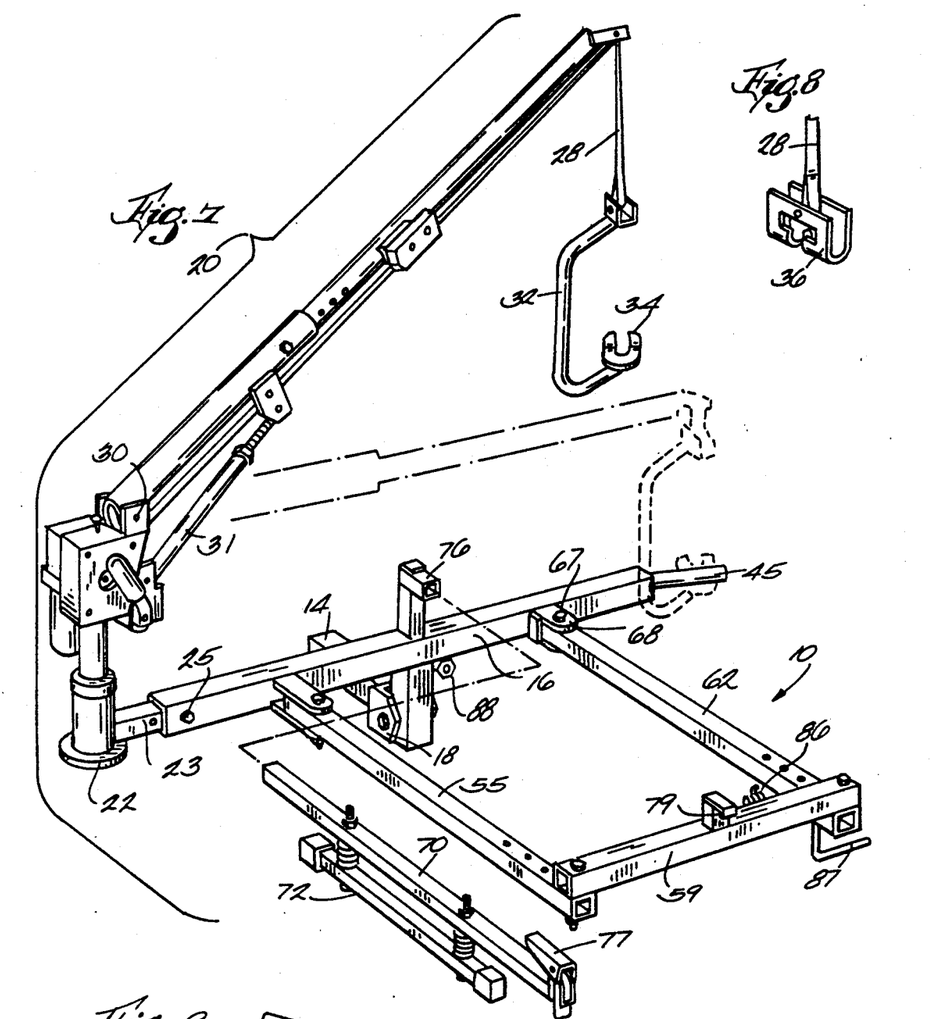
FIG. 7 is a perspective view of a carrier attachment of this invention, also illustrating the locked down position of the hoist mechanism by means of dotted lines.
FIG. 8 is a broken away perspective view illustrating an alternative load-engaging attachment for a hoist of this invention.
Figure 9:
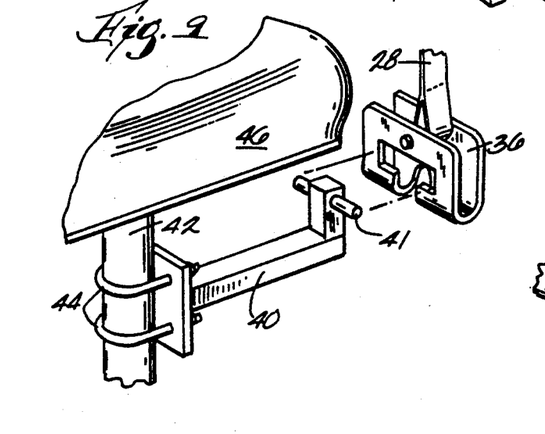
FIG. 9 is a broken away perspective view illustrating the use of the attachment of FIG. 8.
Figure 10:
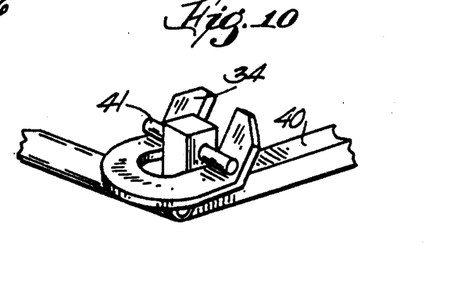
FIG. 10 is a broken away perspective view illustrating the use of the lifting attachment illustrated in FIG. 7.

In order to enable lifting of a heavy load such as a personal mobility vehicle, a C-shaped hook 32 having spaced bent fingers 34 is preferably provided. As seen in FIG. 9, a lifting bracket 40 having sideways extending pins adapted to engage the lifting yoke 32 can be provided. Bracket 40 can be secured to a seat support 42, for example, on the personal mobility vehicle by means of U-bolts 44. The manner of engagement of pins 41 on bracket 40 by bent fingers 34 is best seen in FIG. 10. An alternate hoisting end 36 can be provided at the end of cable 28 as shown in FIGS. 8 and 9. Bracket 36 is also provided with an opening to engage cross pin 41. A prong 45 is secured to the end of stationary member 16 opposite hoist bracket 22 in order to provide a place to secure supporting hook 32 of hoist 20 when in the storage mode illustrated by dotted lines in FIG. 7. The positions of prong 45 and bracket 22 can be interchanged, if desired, so that hoist 20 is located on the right side of vehicle 12 instead of on the left as shown in the drawings.

Figure 11:
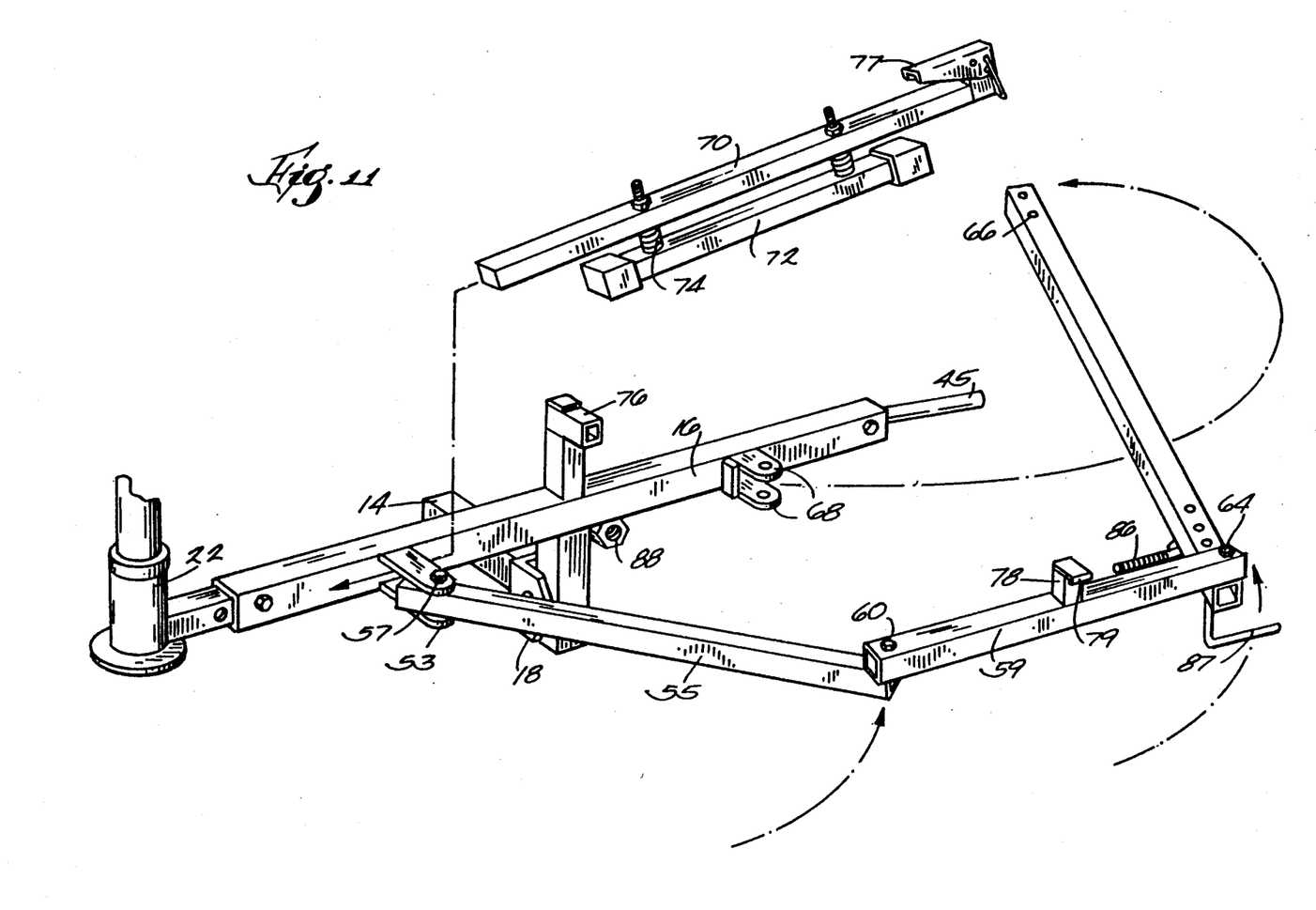
FIGS. 11-14 are perspective views of a carrier attachment of this invention with the hoist mechanism shown broken away and illustrating the steps involved in folding the carrier of this invention from the extended position to the collapsed storage position.
Figures 14, 15A, 15B:
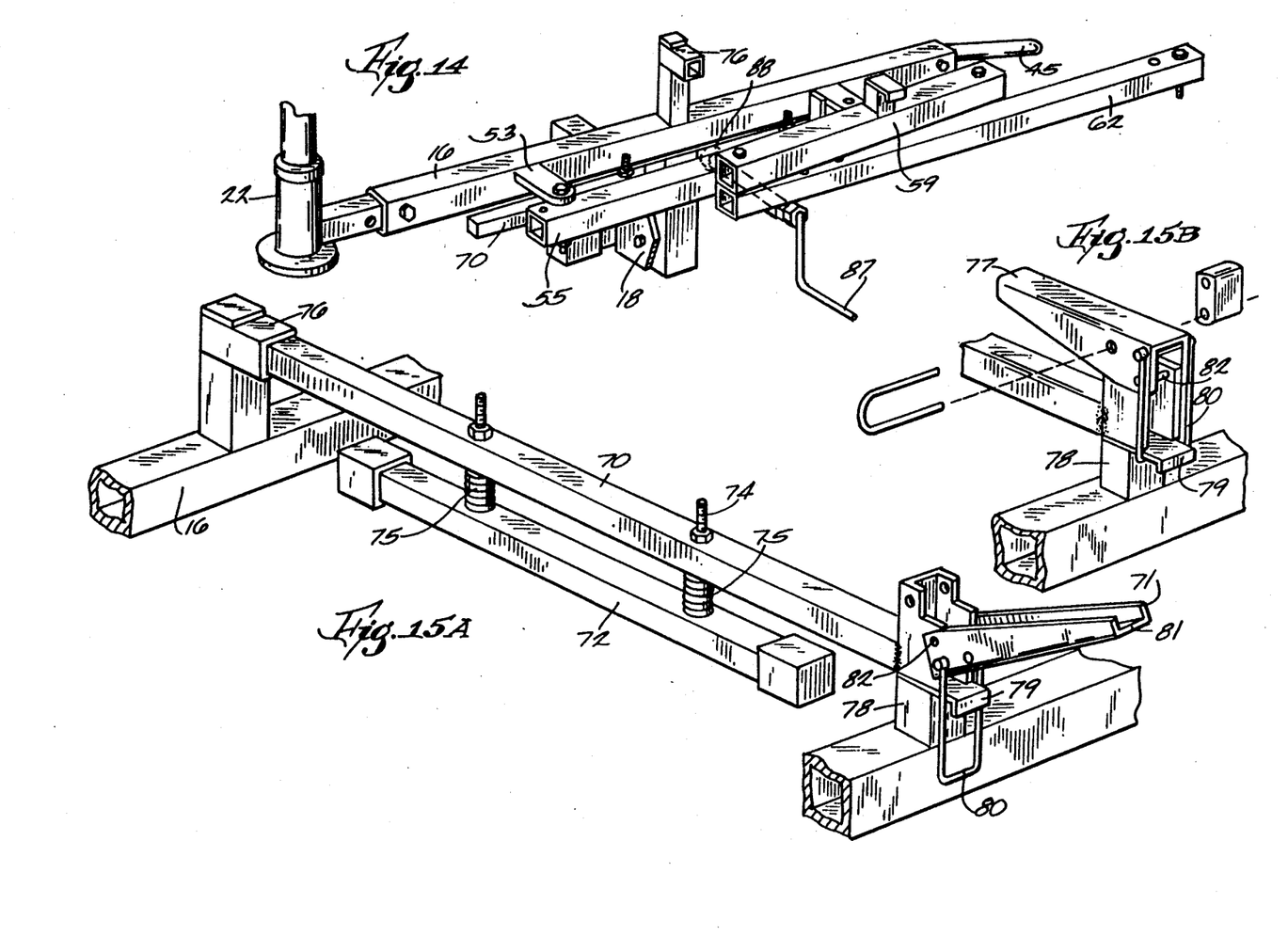
FIG. 15a is a broken away perspective view illustrating the mode of attachment of the personal mobility vehicle hold down bar to the carrier of this invention.
FIG. 15b is a broken away perspective view of an end of the hold down bar of FIG. 15a showing the attachment mechanism in the latched position.
Figure 16:
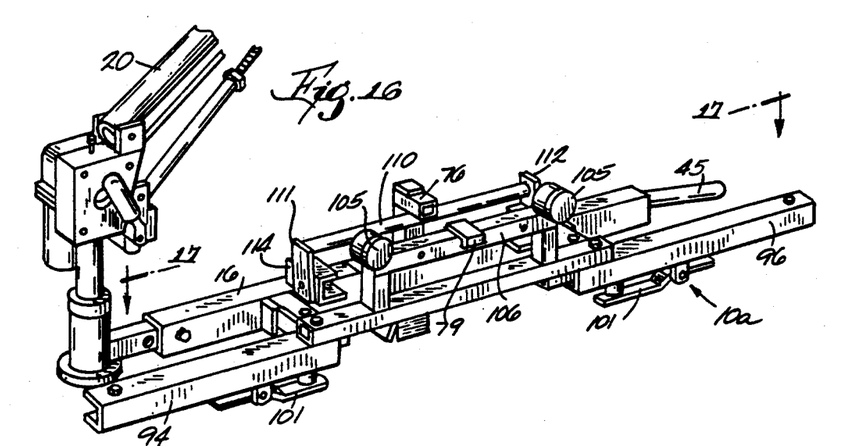
FIG. 16 is a broken away perspective view of an alternate embodiment a carrier in the collapsed position.
Figure 17:
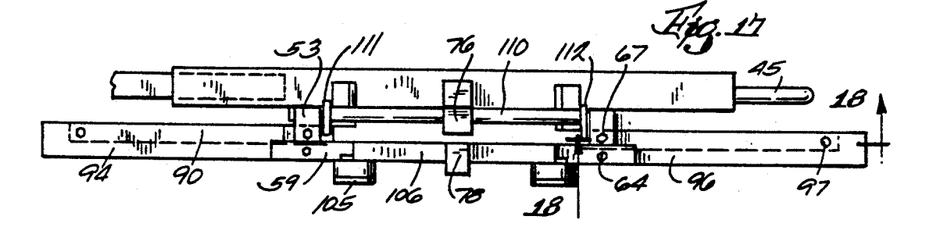
FIG. 17 is a broken away top view of the carrier of FIG. 16 viewed along lines 17—17.

Welded to and extending rearwardly from stationary member 16 is a bracket 53 formed of upper and lower arms having aligned holes therethrough. A pivotable side member 55 is secured through said holes by means of a bolt or pin 57 and can be pivoted from a storage position parallel to member 16 as seen in FIG. 14 outwardly as seen in FIG. 11 to a fully extended position as seen in FIG. 7. Pivotally attached to the opposite end of member 55 is a rear transverse member 59 pivotally secured to the end of member 55 by means of a pin or bolt 60. Another side member 62 is pivotally attached to the opposite end of cross member 59 by means of another bolt or pin 64. The free end of the other side member 62 is adapted to be attached to another bracket 68 integral with member 16 by means of a bolt or pin 67 passing through hole 66.

Figure 6:
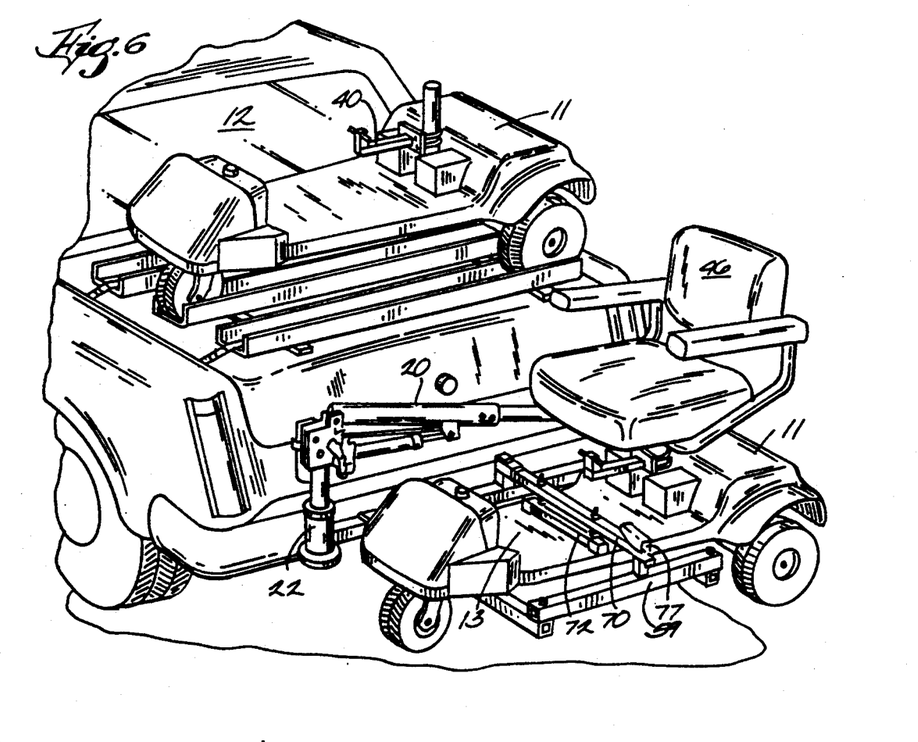
FIG. 6 is a perspective view of an automobile with parts broken away showing a personal mobility vehicle loaded on a trunk lid carrier and a second personal mobility vehicle loaded on a carrier of this invention.

In order to secure personal mobility vehicle 11 to attachment 10, a cross member 70 is provided. Attached to cross member 70 is a parallel member 72 adapted to engage the floor pan 13 of personal mobility vehicle 11 as seen in FIG. 6. The spacing between member 70 and 72 is adjustable by means of bolts and nuts 74 which may be provided with springs 75 in order to exert a firm downward pressure on floor pan 13.

Cross member 70 is adapted to be inserted in tubular receiving member 76 which is integrally attached to cross member 16 as best seen in FIG. 15a. The opposite end of member 70 is provided with a latch mechanism 77 and fits into bracket 78 welded in an upright orientation to the center of cross member 59. Bent flange 79 is provided on bracket 78 in order to engage loop 80 of latch mechanism 77. When handle 81 is rotated upward from the position in FIG. 15a to that shown in FIG. 15b, loop 80 engages flange 79 and because the upper end of loop 80 has passed over center relative to pivot pin 82, the mechanism will become locked in place to secure lower member 72 against floor pan 13 and hold cross member 70 in bracket 76. A pin passing through bracket 76 and the end of member 70 can optionally be provided if desired. The presence of pin 84 may improve the load carrying capacity of attachment 10.

Figure 12:
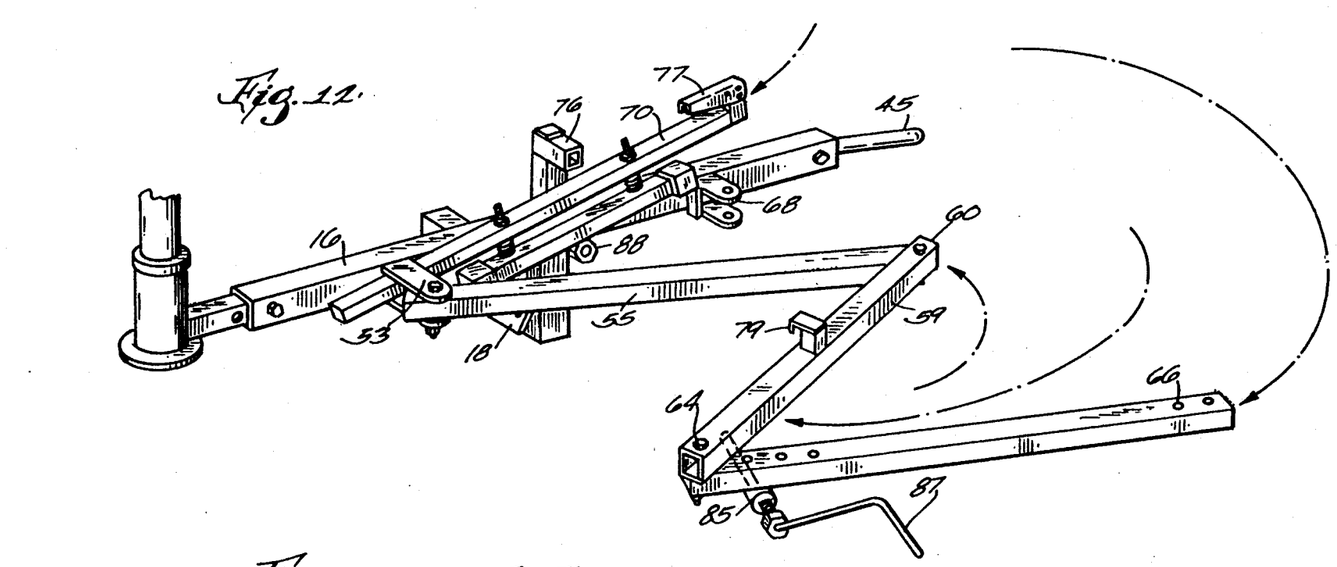
Figure 13:
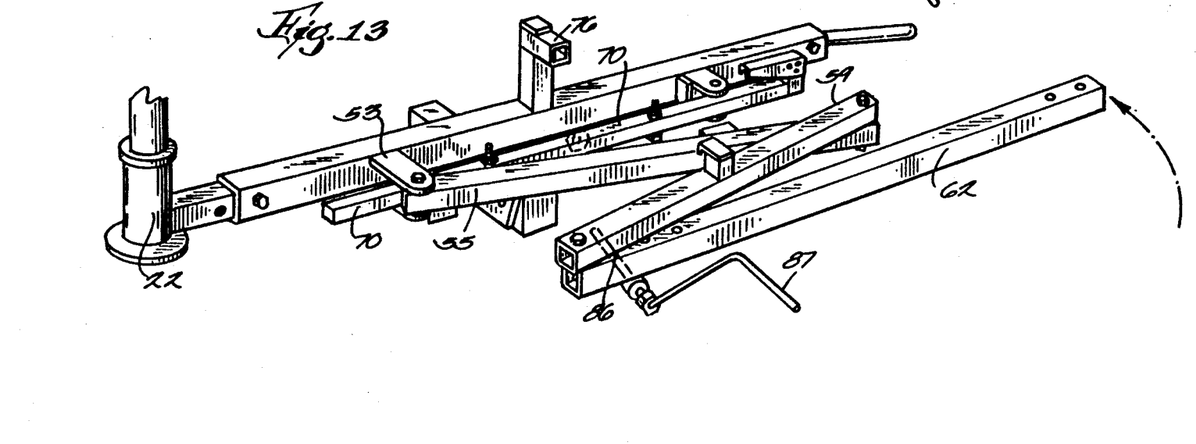

In order to securely lock the attachment 10 in place, a threaded rod 86 is rotatably held within a bracket 85 and provided at its end with a crank handle 87. The threaded end of rod 86 is adapted to be threaded into a nut 88 welded to bracket 16. The attachment can thus be secured by hand in the storage position illustrated in FIGS. 4 and 5 and loosened by hand to enable extension of attachment 10 rearwardly from the vehicle into the load carrying extended position best seen in FIG. 7. Storage member 70 may be inserted between the fingers of bracket 53 as seen in FIGS. 12 and 13 and then similarly placed between the fingers of bracket 68. Once the side members 55 and 62 and the end member 59 are folded into the storage position illustrated in FIGS. 13 and 14, member 70 also becomes locked securely in a storage position.

Figure 18:
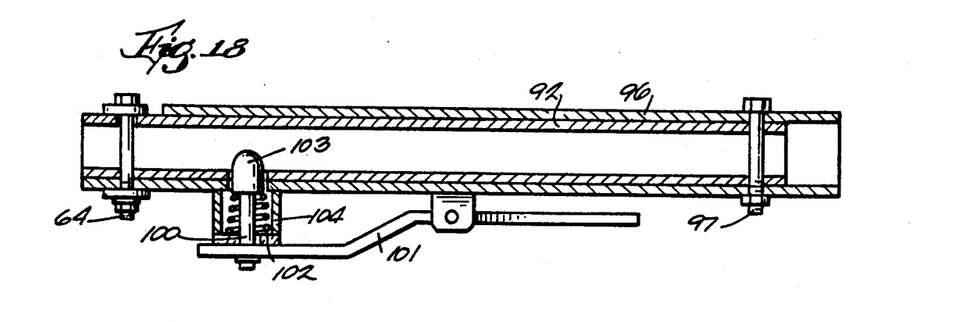
FIG. 18 is a cross-sectional view taken along line 18—18 of FIG. 17.
Figure 19:
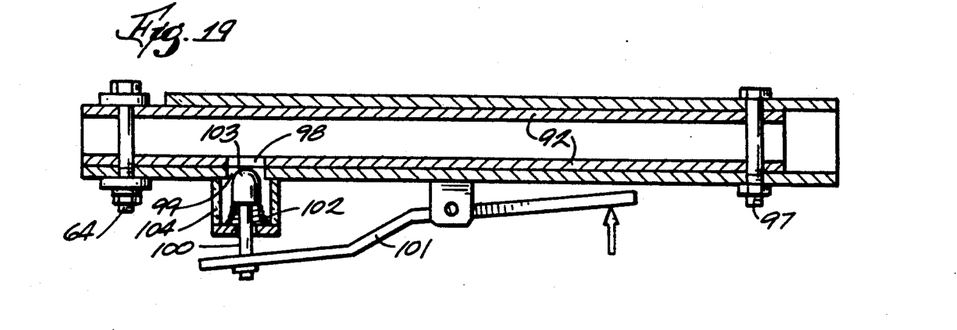
FIG. 19 is a cross-sectional view taken along lines 18—18 of FIG. 17 showing unlatching of the locking mechanism.
Figure 20:
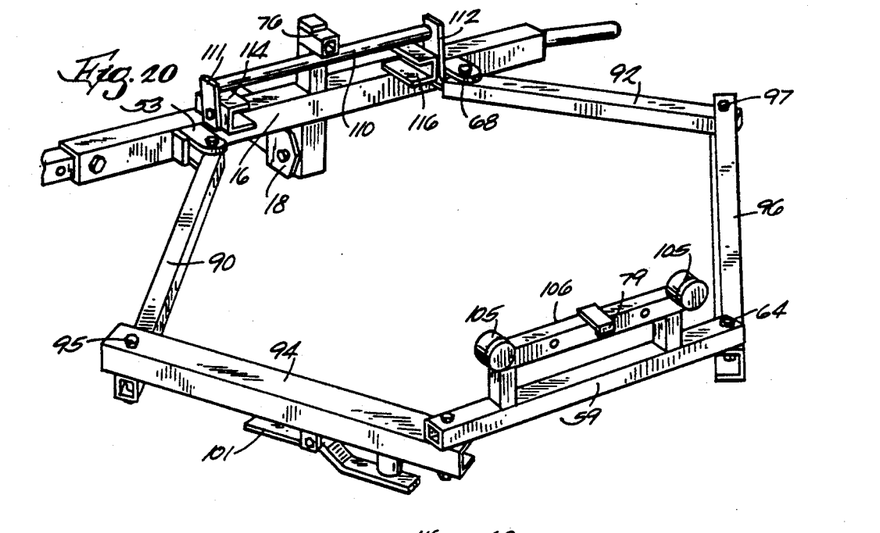
FIG. 20 is a broken away perspective view showing the carrier of FIG. 16 in a partly unfolded position.
Figure 21:
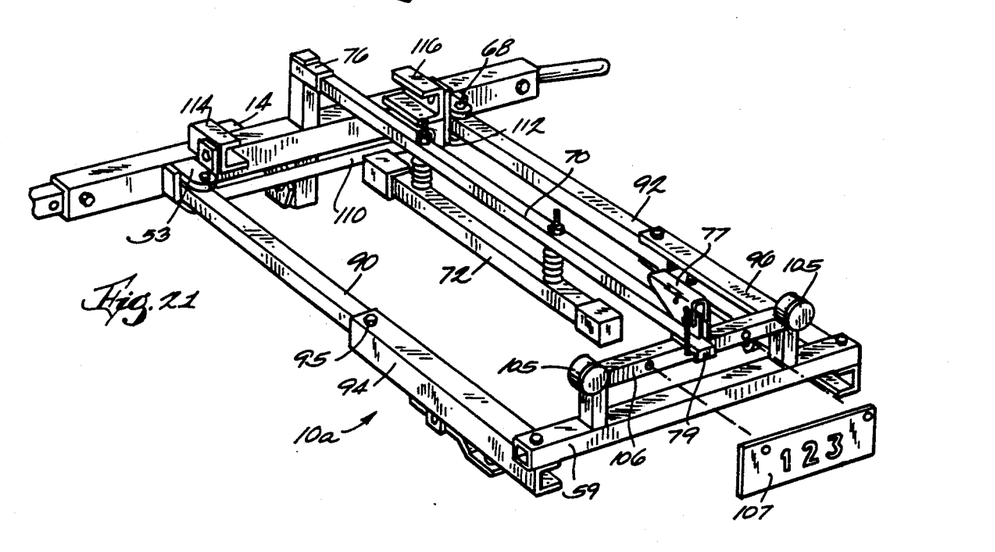
FIG. 21 is a perspective view showing the carrier of FIG. 16 in the extended, load carrying position with the personal mobility vehicle hold down bar attached.

In the alternate embodiment of FIGS. 16-21, side members 55 and 62 are replaced by foldable side members as best seen in FIGS. 20 and 21. In this embodiment inner folding members 90 and 92 are pivotally attached to brackets 53 and 68 by means of pins 57 and 67, respectively. Members 90 and 92 are pivotally attached at their outer ends to outer pivoting members 94 and 96 by means of pins 95 and 97, respectively. The outer ends of members 94 and 96 are pivotally attached to opposite ends of rear cross member 59 by means of pins 60 and 64, respectively. In this embodiment the attachment 10a can be pivoted rearwardly from the collapsed position shown in FIG. 16 through the intermediate position shown in FIG. 20 to the fully extended position shown in FIG. 21 without removing any pins or bolts.

One means of providing for locking of the alternate embodiment 10a in the storage position is illustrated in FIGS. 18 and 19. Holes 98 and 99 through elements 92 and 96, respectively, are provided so as to come into alignment when the members are in the folded position shown in FIG. 16. A pin 100 carried by pivotable arm 101 locks the parts together. A spring 102 biased against head portion 103 of pin 100 urges the pin into the locked position. A housing 104 provides a surface for engagement of the end of spring 102 to provide an upward bias thereof The members are unlocked by depressing lever 101 as shown in FIG. 19 to remove pin 100 from the aligned holes 98 and 99 thus freeing the members from each other. A similar mechanism 101 is provided to lock unlocked arms 90 and 94 to each other.

In order to comply with motor vehicle code regulations, a pair of taillights 105 can be provided, mounted as shown upon a raised bracket 106. Taillights would be connected by wiring, not shown, to the wiring system of the motor vehicle. As seen in FIG. 21, bracket 106 also provides a place to mount a license plate 107, as also required by law. Also, as best seen in FIG. 20, a sway stabilizing bar 110 can be provided. The ends 111 and 112 of bar 110 are of such a length that bar 110 cannot be lowered until the arms 90 and 92 are in the fully extended position shown in FIG. 21. In that position the ends 111 and 112 of bar 110 bear against the forward ends of members 90 and 92 to prevent them from swaying. Bar 110 is pivotally attached to brackets 114 and 116 which are integral with cross bar 16.

Figure 3:
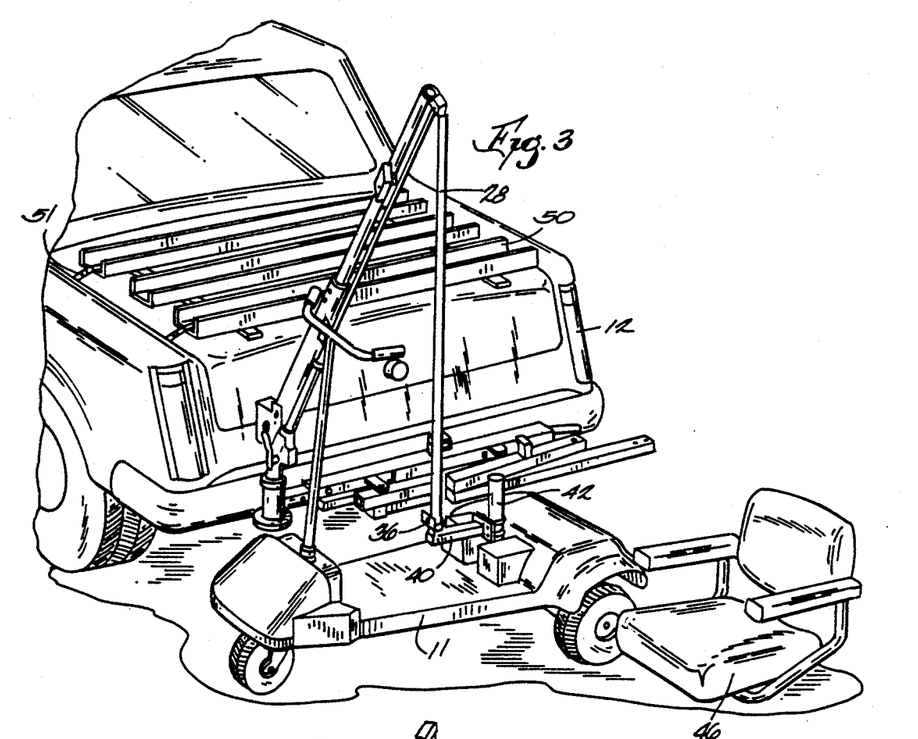
FIGS. 3 and 4 are perspective views showing a carrier of this invention in collapsed condition and illustrating the loading of a personal mobility vehicle onto a separate rack mounted over the trunk lid of an automobile, with parts of the vehicle being broken away.
Figure 4:
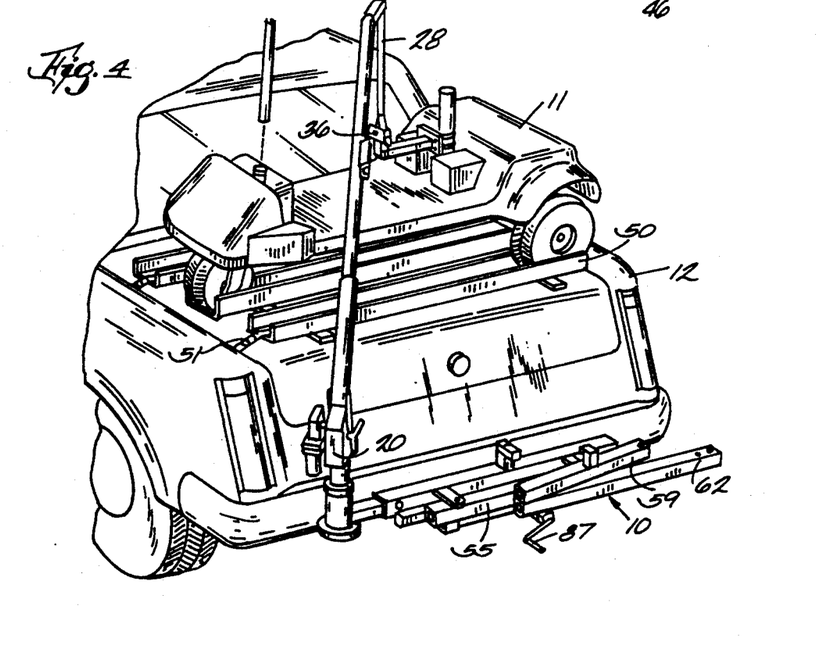
Figure 5:
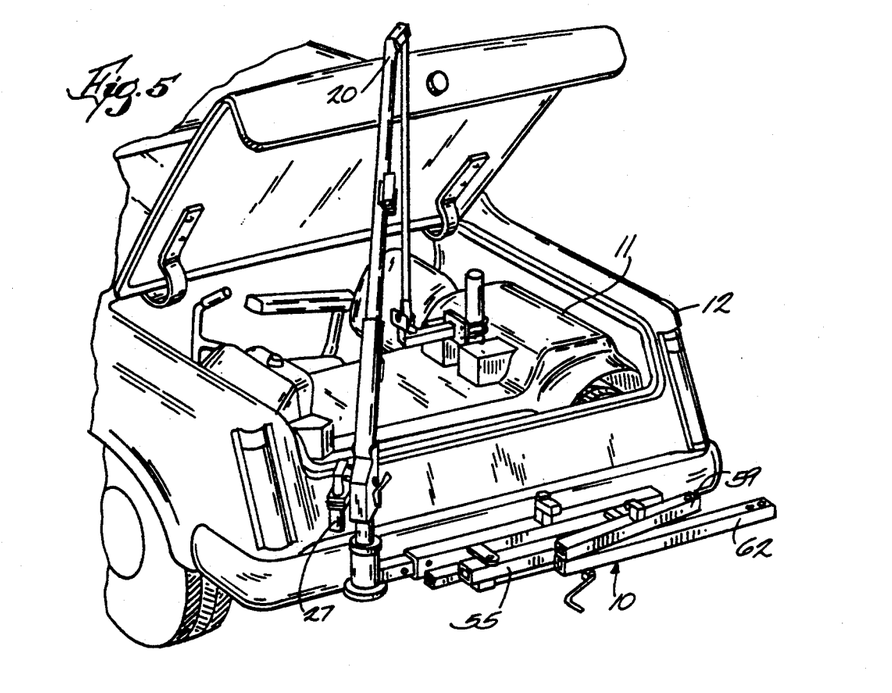
FIG. 5 is a broken away perspective view of an automobile with the carrier of this invention attached in the collapsed condition and illustrating loading of a personal mobility vehicle into the automobile trunk.

As seen in FIGS. 3 and 4, hoist 20 can be utilized also to lift personal mobility vehicle 11 onto a trunk lid mounted rack 50. Rack 50 consists of upwardly facing C-shaped channels which are secured to the trunk lid by suitable straps 51. This front mount bracket 50 can be utilized to transport one mobility vehicle, preferably with seat 46 removed as seen in FIG. 4. A second personal mobility vehicle can then be placed on and transported by attachment 10 of this invention as shown by FIG. 6. Alternatively, as seen in FIG. 5, a personal mobility vehicle 11 with seat removed can be placed in the trunk compartment of vehicle 12 if that compartment is of sufficiently great dimensions.

Figure 1:
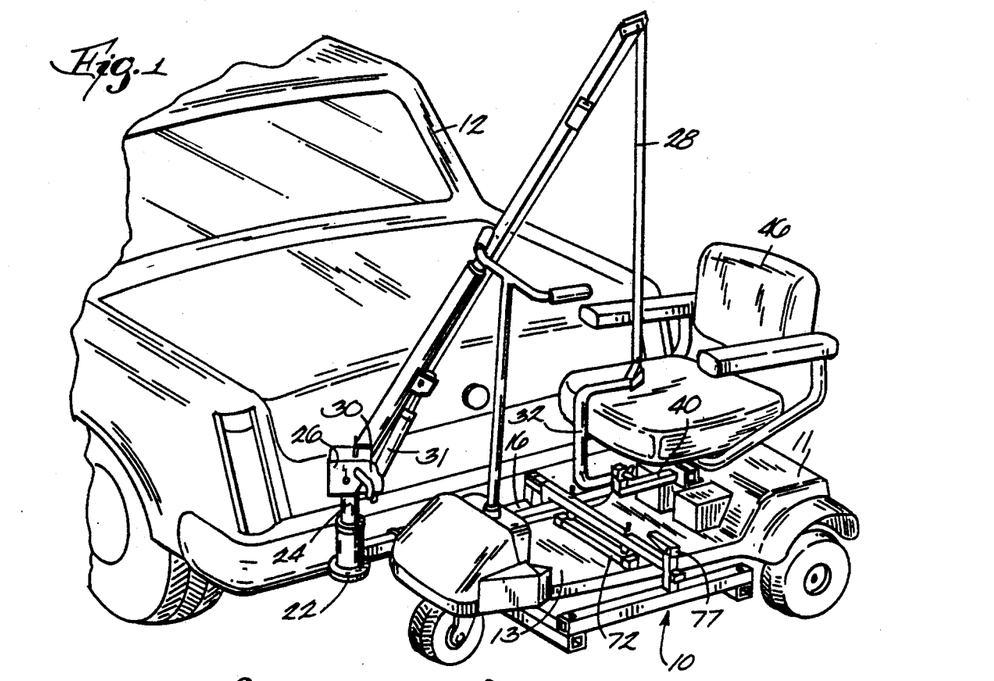
FIG. 1 is a perspective view showing a personal mobility vehicle being loaded onto a carrier of this invention attached to the rear of a motor vehicle, with parts of the vehicle being broken away.
Figure 2:
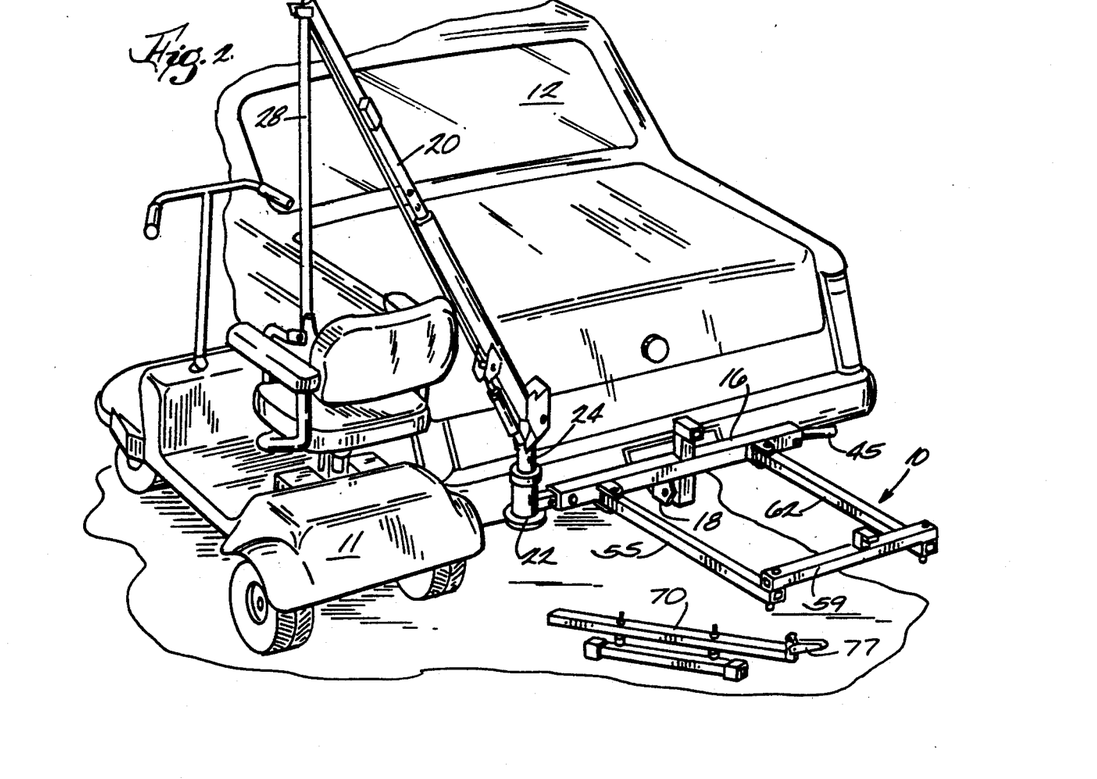
FIG. 2 is a perspective view of the same items shown in FIG. 1 illustrating unloading of the personal mobility vehicle from the carrier.

As seen in FIGS. 1 and 2, the hoist 20 can be used to raise the personal mobility vehicle off of attachment 10 and pivoted alongside the vehicle, for example, onto a sidewalk in the position shown in FIG. 2.

While specific embodiments of the invention have been shown for purposes of illustration, these embodiments are illustrative and thus the invention should be construed as limited only by the scope of the following claims.

What is claimed is:

1. An attachment for a rear of a motor vehicle for transporting a load thereon comprising a first frame member removably attachable to the rear of a motor vehicle in a horizontal orientation transverse to a longitudinal axis of the vehicle, a load carrying frame pivotally attached to said first frame member at at least one pivot point, said load carrying frame being pivotable from a storage position in a horizontal plane parallel to said first frame member to an extended load carrying position transverse to and extending rearwardly from the first frame member, means to secure said load carrying frame in the storage position, means to secure said load carrying frame in the extended position, and, a hoist mechanism attached to one end of said first frame member by a support member affixed to said first frame member, said hoist mechanism being rotatable on said support member about a vertical axis and pivotable thereon in a vertical plane, said hoist mechanism being further provided with an extendable retractable flexible load lifting line.

2. An attachment according to claim 1 comprising opposed side frame members on said load carrying frame each pivotally attached at one end to the first frame member and pivotably attached at the opposite end to a rear load supporting frame member, each of said side members being formed of two pieces that are joined at a central pivot point, so that the load carrying frame can be extended by pivoting each of said side members into linear alignment.

3. An attachment according to claim 1 wherein said load carrying frame comprises opposed side members and a rear member, said frame being foldable from a storage position wherein one of said side members is pivotally attached to the first frame member, the rear frame member is folded against said side frame member, and the other side frame member is folded against a rear frame member, said load carrying frame being pivotable to an extended position wherein said second frame member is coupled to said first frame member by a pin.

4. An attachment according to claim 1 further comprising a load securing cross member secured at one end to a center of said first frame member and at its opposite end to a center of the rear frame member.

5. An attachment according to claim 1 wherein said load lifting line is a steel cable retractable by an electrically powered winch.

* * * * *